United States Patent Office 3,165,681
Patented Jan. 12, 1965

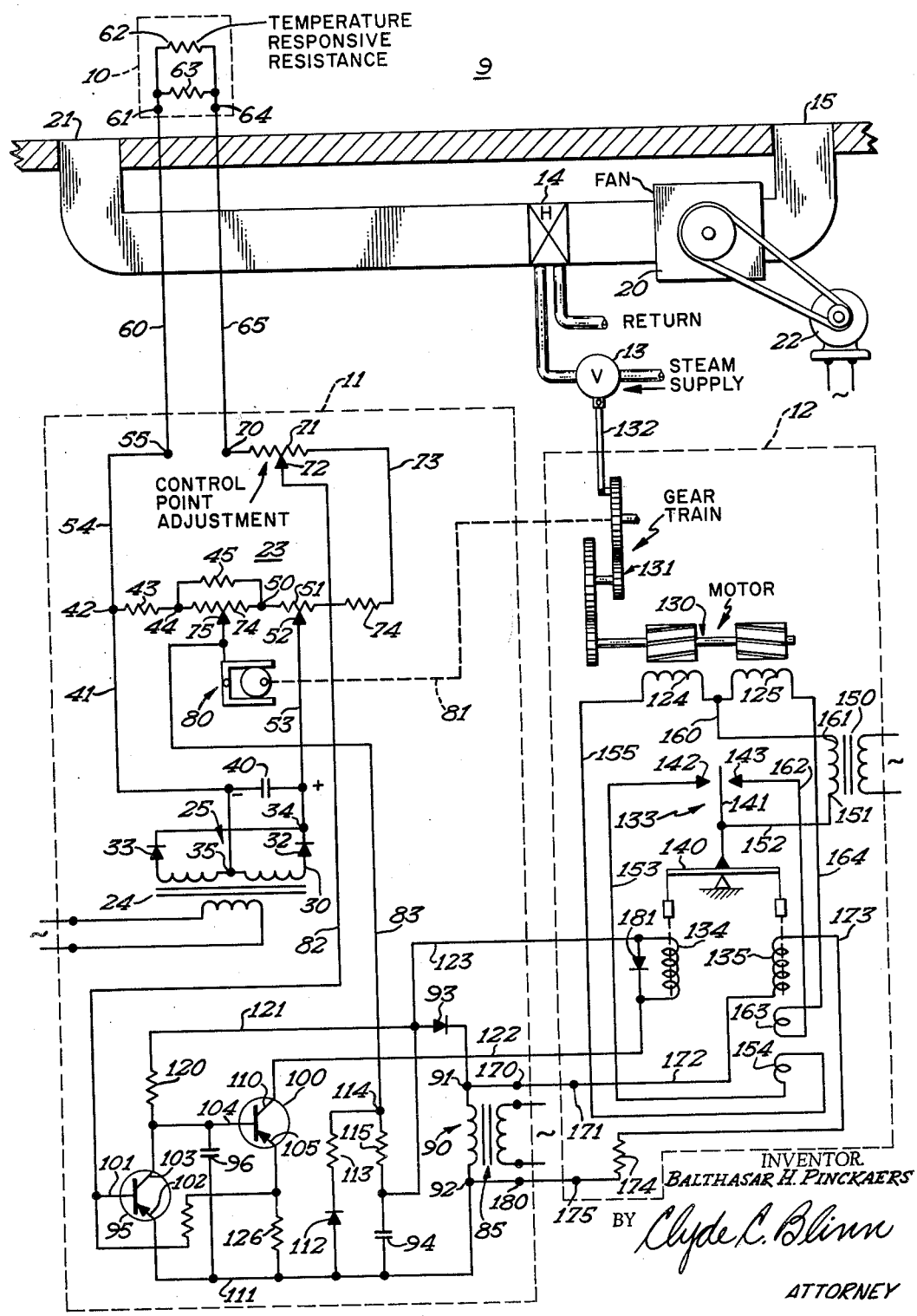

---

3,165,681
MOTOR CONTROL APPARATUS EMPLOYING A BALANCEABLE SWITCHING DEVICE
Balthasar H. Pinckaers, Edina, Minn., assignor to Honeywell Inc., a corporation of Delaware
Filed Dec. 31, 1962, Ser. No. 248,666
4 Claims. (Cl. 318—28)

The present invention is concerned with an improved motor control system; specifically, a motor control system having a balanceable type switching device with two opposing magnetic members, one of which is constantly energized and the other is energized in a modulating manner from the output of a condition responsive circuit.

In motor control systems where a balanceable type switching device or actuator is used to control a reversible motor, the energization of the two opposing magnetic solenoids of the balanceable switching device has been controlled by the output of a condition responsive circuit. A typical application is shown in the John L. Harris Patent 2,259,343. With such a circuit, the application of an amplified A.C. voltage signal to each of the solenoids of the balanceable switch actuator presents some difficulty.

In order to allow the use of amplifying means to amplify the signal from the condition responsive means, a system making use of a modulating direct current on one coil of the balanceable device to oppose the effects of the constantly energized alternating current coil has been provided. By the use of such a modulating direct current, a rather inexpensive D.C. amplifier can be used between the condition responsive device and the D.C. actuated coil. This greatly reduces the cost of the overall system and the performance including the control differential of the temperature responsive means is improved.

An object of the present invention is to provide an improved control system making use of a balanceable controller for driving a reversible motor wherein one solenoid is energized by modulating direct current and another solenoid is constantly energized by alternating current.

Another object of the present invention is to provide a temperature control system having a temperature responsive element providing a direct current modulating output which is applied to one coil of a balanceable switch actuator for driving a reversible motor. A second coil of the switch actuator is constantly energized by alternating current and is aided or opposed by A.C. actuated windings to obtain booster action.

These and other objects of the present invention will become apparent upon the study of the following specification and drawing of which A single figure is a schematic representation of the temperature control system showing the motor controller with the balanceable switch mechanism and the bridge circuit which is connected to the remote space temperature responsive element.

Referring to the single figure, a thermostat or space temperature responsive resistance device 10 of space 9 is connected to a bridge and amplifier circuit 11 to control the operation of a reversible motor 12 which is connected to control the position of a conventional motorized valve 13. Valve 13 controls the supply of temperature conditioning fluid or steam to a heat exchanger or coil 14 connected in the forced air system which circulates air from the space through a return passage 15, a fan 20 and an air delivery passage 21. Fan 20 is driven by a constant speed motor 22.

Bridge-amplifier circuit 11 has a conventional bridge circuit 23 to which thermostat 10 is connected. A source of power or step-down transformer 24 which has a primary connected to a source has a center-tapped secondary winding 25. The two ends 30 and 31 of secondary 25 are connected through diodes 32 and 33, respectively, to a common output terminal 34. A second output terminal for the power supply exists at a center tap terminal 35. A condenser 40 is connected across the output terminals 34 and 35 to provide a filtered source of D.C. voltage to the bridge circuit. Connected between the output terminals 34 and 35 of the source of power in parallel with condenser 40 are two branches of bridge network circuit 23. A first branch is traced as follows: from terminal 35, a conductor 41, a junction 42, a resistor 43, a connection 44, a resistor 45, a connection 50, a resistance 51 having a movable tap 52 associated therewith, and through the tap 52 by a conductor 53 to the other terminal 34 of the source of power. A second branch circuit is connected from junction 42, a conductor 54, a terminal 55, a conductor 60, a terminal 61 of thermostat 10, a parallel circuit comprising a temperature responsive resistance element 62 and a conventional resistance element 63, a terminal 64, a conductor 65, a terminal 70, potentiometer resistor 71 having a movable tap 72 thereon, a conductor 73, a fixed resistance 74, potentiometer resistance 51, through the tap 52 and conductor 53 to the other side of the source of power 34. Connected in parallel with resistance 45 is a potentiometer winding 74 which has a movable wiper 75 positioned thereon by a follow up cam mechanism 80 mechanically connected through a linkage 81 to the output of motor 12. The output of bridge 23 exists between wiper 72 and wiper 75 which are connected to conductors 82 and 83, respectively, to deliver a signal to an amplifier circuit 84 which is a part of bridge-amplifier 11.

Amplifier 84 has a source of power or transformer 85 which has a primary winding connected to a source of power and a step-down secondary winding 90 having end terminals 91 and 92. Connected across terminals 91 and 92 is a series circuit comprising a rectifier 93 and a capacitor 94 whereby a filtered and rectified D.C. voltage exists across capacitor 94.

Amplifier 84 includes two transistors 95 and 100. Transistor 95 has a base terminal 101, an emitter 102 and a collector electrode 103. Transistor 100 has a base terminal 104, an emitter 105 and a collector electrode 110. The input signal to amplifier 84 is fed by conductors 82 and 83 from the output of the bridge circuit 23 to the first stage of amplification or transistor 95 of the amplifier through a circuit traced as follows: conductor 82, base electrode 101, emitter 102, a conductor 111, a diode 112, a resistor 113, a terminal 114 and conductor 83. A bias current of one direction exists through diode 112 and resistor 113 by the circuit traced as follows: from capacitor 94, diode 112, resistor 113, terminal 114, resistor 115 and back to capacitor 94. The bridge circuit applies a modulating signal to transistor 95. As the current from emitter 102 to base 101 increases, the collector current of transistor 95 which flows through resistor 120 and back to the source of D.C. power through a conductor 121. An increase in the current of resistance 120 decreases the base current bias on transistor 100 flowing from terminal 92, conductor 111, a resistor 126, emitter 105, and to resistor 120 and back to the other side of the source of power. Upon a decrease in this current, the collector current of transistor 100 decreases to decrease the D.C. current through a circuit of motor 12 connected between conductors 122 and 123 of the output of amplifier 84.

Motor 12 is of a conventional type having a first and a second winding 124 and 125 which drive a rotor 130 of the motor in opposite directions depending upon which is energized. Rotor 130 is connected by conventional gear train 131 to the output shaft 132 of valve 13. A balanceable switch operator or relay 133 of a type shown in the Harris patent has a pair of solenoids 134 and 135 acting oppositely upon the member 140 which positions the movable switch member 141 between two fixed contacts 142 and 143. When the pull or energization of coils 134 and 135 is equal, member 141 stays intermediate contacts 142 and 143. Upon engaging one of the contacts 142 and 143, member 141 connects the source of A.C. power 161 to one or the other of the windings of motor 130 to drive the rotor in one direction or the other by a circuit traced as follows: a terminal 151 of the secondary of the step-down transformer 150, which has a primary connected to a source, a conductor 152, member 141, contact 142, a conductor 153, a booster winding 154 which is associated in a magnetic relationship with winding 135, a conductor 155, motor winding 124, a conductor 160, and back to the other side of the source of power 161. When member 141 engages contact 143, a similar circuit exists for energizing winding 125 through a circuit traced as follows: from terminal 151, conductor 152, member 141, contact 143, a conductor 162, a booster winding 163, a conductor 164, winding 125, and back to the other side of the source of power 161 through conductor 160.

Winding 135 is constantly energized by the output of secondary winding 90 of the bridge amplifier relay through a circuit traced as follows: from terminal 91, a terminal 170, a terminal 171, a conductor 172, winding 135, a conductor 173, a resistor 174, a terminal 175, a terminal 180, and back to the other side 92 of the source A.C. power. A diode 181 is connected in parallel with winding 134 to smooth the D.C. current supplied to winding 134 from the amplifier 84, and to prevent transients from damaging transistor 100.

*Operation*

With an A.C. power source connected to the primary windings of each of the transformers 24, 85 and 150, the control system is placed in operation so thermostat 10 adjusts the position of the valve 13 to maintain a temperature in space 10 as selected by the control point adjustment made upon positioning wiper 72. As shown, the system is in a balanced condition where the temperature of the space is equal to the temperature selected by the control point adjustment, and switch 133 is balanced to de-energize motor 130 and maintain valve 13 in a set position to allow a certain amount of steam to flow to coil 14. As previously mentioned, switch 133 is controlled by the balanceable network including coils 134 and 135. By the size of resistor 174, the A.C. current in coil 135 is selected so the switch operator can move from one side to the other to have member 141 engage either contact 142 or 143 depending upon the current flow through coil 135. As shown, the D.C. current flow through coil 134 is such to overcome the effect of the constant A.C. current flowing through coil 135 to maintain the movable member 141 intermediate of the contacts.

Let us assume the temperature in the space increases to increase the resistance 62 of the temperature responsive resistance. The net resistance between terminals 55 and 70 would increase and the voltage applied to the base 101 of transistor 95 with respect to the emitter electrode 102 would increase positively. The increase in positive bias on transistor 95 would decrease the current flow between the emitter 102 and collector 103 to decrease the voltage drop across resistor 120. A decrease in the voltage drop across resistor 120 results in a negative bias on the transistor 100 to increase the current flow between emitter 105 and collector 110 and thus the D.C. current flow to winding 134. Upon a predetermined increase in the current flow through winding 134, switch member 141 is moved to the left to energize winding 124 of motor 130 to drive valve 13 in a closed direction to cut down the flow of steam to coil 14. By means of wiper 75 which is repositioned through the mechanical connection 81 to the gear train, bridge circuit 21 is rebalanced. Wiper 75 is moved to the right to reestablish balance and cut down the current flow to coil 134 so member 141 moves to the center position as shown. By a certain amount of closing of valve 13, the steam supply is diminished.

In order to insure that member 141 engages contacts 142 and 143 in a positive manner, booster winding 154 is connected in series with winding 124 of the motor. In the action previously explained, the closure of the switch of member 141 and contact 142 would energize booster winding 154 to counteract the effect of winding 135 or assist the effect of winding 134. The use of the booster winding insures a positive engagement of the contacts to overcome any dirt or corrosion which might exist and prevents the contacts from moving together quite slowly and "frying" to cause radio noise interference. Booser winding 163 is wound to aid the effect of winding 135 so that upon movement of member 141 against contact 143, additional pull is extered by the booster winding.

A similar operation except in the reverse manner will take place upon a decrease in the space temperature to decrease the resistance of element 62. With such a decrease in the space temperature, the positive bias on base 102 of transistor 95 would decrease and the current flow from emitter 102 to collector 103 would increase to result in a decrease in the current flow to coil 134. Since coil 135 is constantly energized by a certain current, a decrease in the current flow of coil 134 would cause member 141 to move to the right to engage contact 143. With such an operation of switch 133, motor 130 is energized through winding 125 to result in movement of the valve in an opening direction by an amount depending upon the change in resistance of element 62 until the rebalance network or the position of wiper 35 was readjusted to balance bridge 23.

The input signal to amplifier 84 passes through a circuit including resistor 113 and diode 112, which are connected to have a constant energization through a circuit connected in parallel with capacitor 94 of the source of power traced as follows: through resistor 115, terminal 114, resistor 113 and diode 112 back to the other side of capacitor 94. The transistor 95 and diode 112 network is to provide automatic compensation for the base-emitter voltage changes of transistor 95 which occur as a function of amplifier ambient temperature. Since there is a D.C. bridge and a direct-coupled D.C. amplifier, the network reduces the control point drift as a function of varying amplifier ambient temperature. Capacitor 96 is connected in the input circuit of transistor 100 to stabilize the circuit and to prevent possible oscillations.

While the invention has been described in one particular manner, the intent of the applicant is to limit the scope of his invention only by the scope of the appended claims in which I claim:

1. In a temperature control system, a bridge circuit having a direct current power supply, a space temperature responsive resistance element, and rebalance potentiometer connected therein for providing an output, a reversible motor connected to control a space temperature changing apparatus, switch means for controlling the energization of said reversible motor in one direction or another depending upon the operation of said switch, a first solenoid for operating said switch means, a direct current amplifier, means connecting said output to said amplifier and said amplifier to control the energization of said first solenoid in response to said output, a second solenoid for counter biasing said switch means, and an alternating current power supply connected to said second solenoid, said switch means energizing said motor means in one direction when said first solenoid has an output greater than said second solenoid and in an opposite direction when said first solenoid has an output less than said second solenoid.

2. In a temperature control system, a reversible motor means for controlling a temperature changing apparatus, a balanceable switch means having a first and a second windings working in opposition to operate a switch in a first or second direction depending on whether said first winding has greater or less effect than said second winding, a source of power, circuit means including said switch means for connecting said source to said motor means to energize said motor in one direction or the other, circuit means connecting said second winding to a said source of power to be constantly energized, temperature responsive means having a modulating voltage output, and electrical circuit means connecting said temperature responsive means to said first winding to control said motor means in one direction or the other.

3. In a motor control system, a balanceable type floating relay having a pair of fixed contacts with a member positioned between said contacts, a constantly energized solenoid and variably energized solenoid for controlling said relay to engage one of said contacts or the other contact depending on the resulting effect of said solenoids, and A.C. source of power, means connecting said source to constantly energize said second solenoid, temperature responsive means responsive to a space temperature, circuit means including said responsive means having a variable D.C. voltage output proportional to space temperature, means connecting said output to said first solenoid, reversible motor means, and circuit means including said relay for connecting said motor to said source of power.

4. In a temperature control system, a reversible motor means for controlling a temperature changing apparatus, a balanceable switch means having a first and a second windings working in opposition to operate a switch in a first or second direction depending on whether said first winding has greater or less effect than said second winding, a source of power, alternating current circuit means connecting said second winding to a said source of power to be constantly energized, a pair of booster windings associated with said second winding, said booster windings being controlled by said switch means to aid in the operation of said switch means, temperature responsive means having a modulating direct current voltage output, and electrical circuit means connecting said temperature responsive means to said first winding to control said motor means in one direction or the other.

No references cited.